United States Patent [19]

Hennchen

[11] Patent Number: 5,748,423
[45] Date of Patent: May 5, 1998

[54] SYSTEM FOR LIMITING SHORT CIRCUIT CURRENT IN 3-PHASE ELECTRIC POWER NETWORKS

[75] Inventor: Norbert Hennchen, Bremen, Germany

[73] Assignee: Wind Strom Frisia GmbH, Minden, Germany

[21] Appl. No.: 682,257

[22] Filed: Jul. 17, 1996

[30] Foreign Application Priority Data

Jul. 17, 1995 [DE] Germany ............... 195 26 062.7

[51] Int. Cl.⁶ ................................................. H02H 7/08
[52] U.S. Cl. ................................................. 361/31; 361/20
[58] Field of Search ........................... 361/20, 21, 23, 361/29–31, 33, 5, 8, 9, 13, 54, 56, 57, 58; 323/205, 207

[56] References Cited

U.S. PATENT DOCUMENTS

| | | | |
|---|---|---|---|
| 4,602,199 | 7/1986 | Walker | 323/207 |
| 4,710,841 | 12/1987 | Bottrell | 361/23 |
| 5,210,685 | 5/1993 | Rosa | 363/109 |
| 5,570,260 | 10/1996 | Kanai et al. | 361/56 |

*Primary Examiner*—Ronald W. Leja
*Attorney, Agent, or Firm*—Evenson, McKeown, Edwards & Lenahan P.L.L.C.

[57] ABSTRACT

An arrangement (1) for limiting the short-circuit current in a three-phase electric power line connected with one or more motors/generators (2) in which in each power line phase (3) leading to the generator/motor (2) at least one pair of series switches (4) are disposed, which are formed by semiconductor switch elements connected in anti-parallel, and in the section between the series switches (4) and the generator/motor (2) elements such as short-circuiting switches (6) are disposed which in case of a short-circuit cause the current of the generator (2) to be shunted away such that the operation of the series switches (4) is assured and the current cannot get into the power line. With the very simple structure of the system, very fast switching times are achieved.

4 Claims, 1 Drawing Sheet

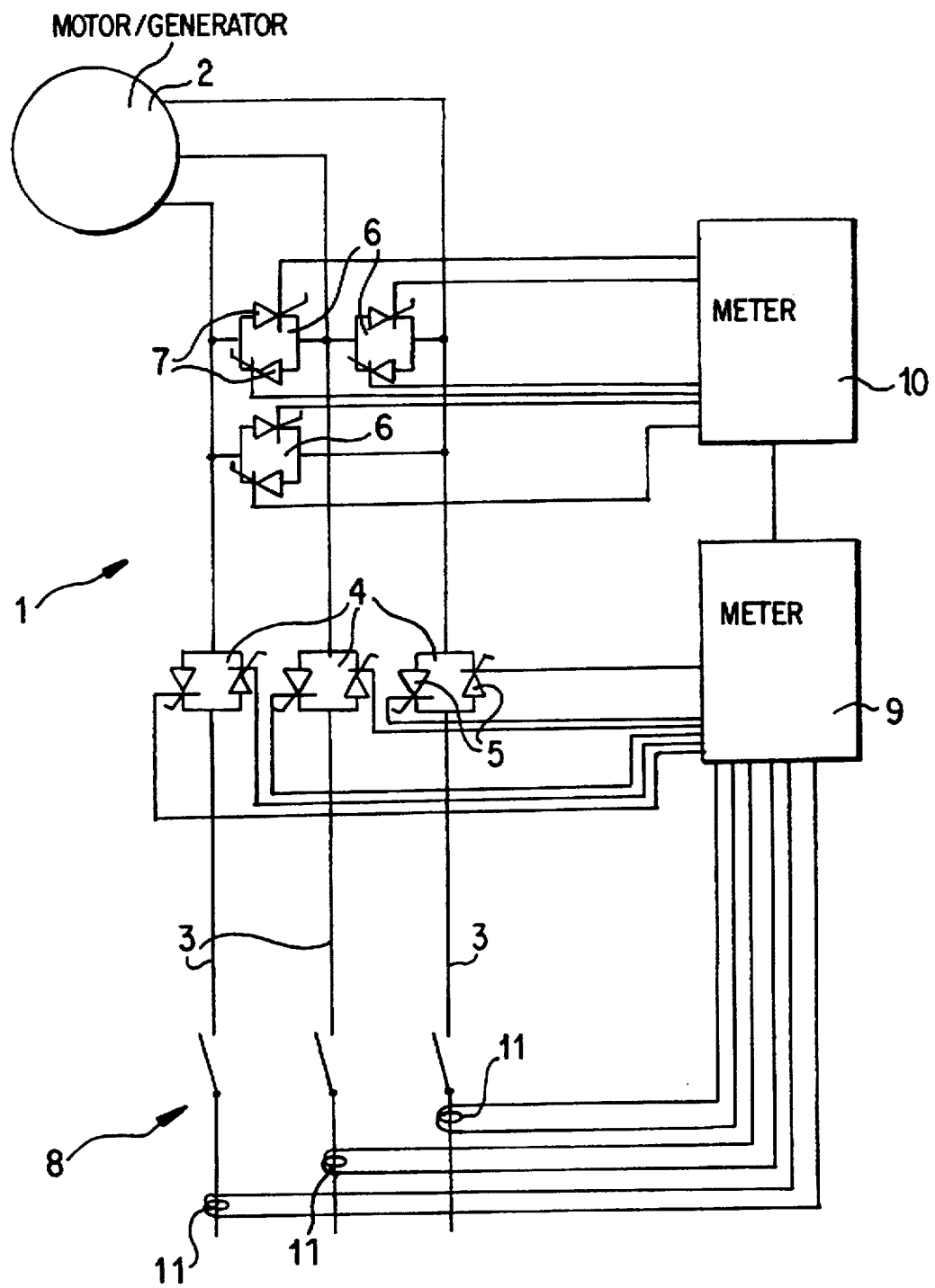

SYSTEM FOR LIMITING SHORT CIRCUIT CURRENT IN 3-PHASE ELECTRIC POWER NETWORKS

BACKGROUND OF THE INVENTION

The invention relates to a circuit for limiting short-circuit current in 3-phase electric power lines connected to one or more motors and/or generators.

In electric power supply lines, when a short-circuit occurs, it is necessary to limit both the time and the level of the input from generators and motors being operated in the network. Preferably, mechanical circuit breakers which are tripped thermally or electromagnetically are used for this purpose. In order to achieve the required fast operating time of these circuit breakers, they are very complex in design. Even so, it is only possible to achieve response times of several milliseconds, which is fundamentally too slow, and consequently the operation of the power supply lines can be endangered. Electronic switches have not been widely adopted, because with semiconductor switching no mechanical cut-off takes place, and therefore such systems do not appear suitable from the viewpoint of reliability.

SUMMARY OF THE INVENTION

It is the object of the invention to provide a system which, by using simple and inexpensive means, will assure that, when a short-circuit occurs in the power network, the reaction time will be decidedly faster than heretofore achievable, and the short-circuit current will be thus very effectively limited.

These and other objects are achieved in accordance with the present invention by providing an arrangement for limiting the short-circuit current in three-phase power lines connected to at least one motor or generator, in which in each phase of the three-phase lines running to the generator or motor, there is at least one pair of series switches which are formed by semiconductor switching elements connected in anti-parallel, and in which short-circuiting switches are disposed in the line between the series switches and the generator or motor which short-circuiting switches in case of a short-circuit cause the current of the generator to be shunted away from the shorted phase such that the operation of the series switches is assured and the current cannot get into the power lines.

At least one pair of series switches, configured as semiconductor elements connected in anti-parallel, is disposed in each phase of the alternating current power line that leads to the generator and/or motor. Between the series switches and the generators or motors means are disposed which in the event of a short-circuit cause the current of the generator to be shunted away and prevented from interfering with the operation of the series switches and keep the current from entering into the line. Depending on the power very fast opening times of 0.7 ms and less can be achieved.

In one preferred embodiment of the invention provision is made so that between the series switches and the generator or motor the phases are connected via circuit breakers which are constructed as at least one pair of semiconductor elements connected in anti-parallel. Furthermore, a measuring device is provided for measuring the phase current and/or the current rise rate. If a short-circuit occurs in the line and a given limit is exceeded, the series switches are electronically blocked. Additionally, a measuring device is provided which determines the difference between the phase currents, and when a short-circuit occurs it operates the short-circuit switch in accordance with this difference such that the current of the generators or motors is shunted away and does not get into the power line. In addition, a mechanical contact can be opened.

In another preferred embodiment of the invention, the arrangement is constructed such that the series switches and the short-circuit switches are formed by thyristors. A system created in this way is characterized by absolutely reliable operation, and the cost of manufacture is very low in comparison to conventional circuit breakers.

BRIEF DESCRIPTION OF THE DRAWING

The invention will be described in further detail hereinafter with reference to an illustrative preferred embodiment depicted in the accompanying drawing which is a schematic representation of a system according to the invention.

DETAILED DESCRIPTION OF PREFERRED EMBODIMENTS

In the drawing, reference numeral 1 identifies a system or arrangement for limiting a short-circuit current. In each phase 3 of the alternating current line leading to a generator or motor 2 there is at least one pair of series switches 4 which are in the form of anti-parallel thyristors 5. Between the series switches 4 and the generator or motor 2 the phases 3 are connected via circuit breakers 6 which are also in the form of thyristors 7 connected in anti-parallel. By means of main switches 8 the generator or motor can be cut off from the power line. As an alternative to the circuit breakers 6 made up of semiconductor elements wired anti-parallel, rectifiers connected to capacitors or else to resistors can be used. The series switches 4 can also be in the form of transistors connected in anti-parallel. The system 1 furthermore comprises an electronic meter 9 for measuring the current input and/or the current rise rate in phases 3. An additional electronic meter 10 detects the difference of the currents in the phases 3. The measurements of current for this purpose are performed by means of the current converters 11 disposed on the phases. Such meters 9 and 10 are known to persons skilled in the art.

When the current and/or the current rise rate of the generator or motor exceeds a predetermined level, the electronic circuit according to the invention detects a short-circuit in the line in a conventional manner. If a short-circuit occurs in the three-phase line, the electronic measuring unit 9 detects this short-circuit based on the amount of current and/or the current rise in phases 3 and causes the series switches 4 to be electronically blocked instantaneously. Since they are thyristors 5, a very rapid blockage occurs, normally at the null point of the sine wave. The blocking is further accelerated since the meter 10 detects the difference of the currents in the phases 3 with a brief delay and, in accordance with this difference, it actuates the thyristors 7 of the circuit breakers 6 such that no current from the generators or motors 2 can be fed from another phase 3 into the short-circuit. The current is shunted out every time. A mechanical contact can additionally be opened.

Due to its simple and inexpensive construction, the circuit according to the invention is suitable as a system for limiting short-circuit current in generators and motors of all kinds. The arrangement of the invention is especially suitable, for example, for use with wind-driven generators which feed power into a general power network so that if a short circuit arises in the power network outside of the wind-driven generator, the wind-driven generator will not feed current into the short circuit.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for limiting short-circuit current in a three-phase power line connected to at least one electromotive component which is one of a motor and a generator, said arrangement comprising:

- at least one pair of series switches connected in each respective phase of the three-phase power line, said switches being formed by semiconductor switching elements connected in anti-parallel; and
- short-circuiting switches disposed in the three-phase power line between the series switches and the electromotive component; wherein
- respective pairs of phases of said three-phase power line are connected together by said short-circuiting switches;
- each of the short-circuiting switches is configured as at least one pair of anti-parallel semiconductor switching elements;
- a measuring device is provided for measuring at least one of a phase current and a current rise rate in said power line;
- when said phase current or current rise rate exceeds a given threshold value indicative of a short-circuit in the power line, the series switches are electronically blocked; and
- a measuring device is provided which detects differences of the phase currents and in case of a short-circuit operates the short-circuiting switches in response to this difference such that the current of the electromotive component is shunted away from a shorted phase, and is prevented from flowing into the power lines.

2. An arrangement according to claim 1, wherein the series switches and the short-circuiting switches are formed by thyristors.

3. An arrangement for limiting short-circuit current in a three-phase power line connected to at least one electromotive component which is one of a motor and a generator, said arrangement comprising:

- at least one pair of series switches connected in each respective phase of the three-phase power line, said switches being formed by semiconductor switching elements connected in anti-parallel;
- short-circuiting switches connected between respective pairs of phases of said three-phase power line at a location between the series switches and the electromotive component, said short-circuiting switches each comprising at least one pair of anti-parallel semiconductor switching elements;
- a device for measuring at least one of a phase current and a current rise rate in each phase of said three-phase power line and, when a predetermined threshold is exceeded, causing said series switches to be electronically opened; and
- a device for measuring differences between phase currents of said three-phase power line and, when a predetermined difference indicative of a short circuit is detected, actuating said short-circuiting switches such that current of said electromotive component is shunted away from a shorted phase and is prevented from flowing into the power lines.

4. An arrangement according to claim 4, wherein the series switches and the short-circuiting switches are formed by thyristors.

* * * * *